(12) United States Patent
Chu et al.

(10) Patent No.: US 6,937,783 B2
(45) Date of Patent: Aug. 30, 2005

(54) 2-D OPTICAL SWITCH WITH LENS MOUNT

(76) Inventors: Charles Chu, 38 Woodleaf, Irvine, CA (US) 92614; Jingyu Zhou, 493 Springbrook N., Irvine, CA (US) 92614

( * ) Notice: Subject to any disclaimer, the term of this patent is extended or adjusted under 35 U.S.C. 154(b) by 185 days.

(21) Appl. No.: 10/282,612

(22) Filed: Oct. 28, 2002

(65) Prior Publication Data

US 2003/0228090 A1 Dec. 11, 2003

Related U.S. Application Data

(60) Provisional application No. 60/387,091, filed on Jun. 7, 2002.

(51) Int. Cl.⁷ .............................. G02B 6/26; G02B 6/42
(52) U.S. Cl. ......................................................... 385/18
(58) Field of Search ............................... 385/16–18, 13, 385/31, 33; 398/50, 83

(56) References Cited

U.S. PATENT DOCUMENTS

| | | | |
|---|---|---|---|
| 4,013,000 A | 3/1977 | Kogelnik | |
| 4,580,873 A | 4/1986 | Levinson | |
| 5,841,917 A | 11/1998 | Jungerman et al. | |
| 6,005,993 A | 12/1999 | MacDonald | |
| 6,144,781 A | 11/2000 | Goldstein et al. | |
| 6,198,856 B1 | 3/2001 | Schroeder et al. | |
| 6,253,001 B1 * | 6/2001 | Hoen | 385/17 |
| 6,278,812 B1 | 8/2001 | Lin et al. | |
| 6,292,281 B1 | 9/2001 | Bala et al. | |
| 6,317,530 B1 | 11/2001 | Ford | |
| 6,317,532 B1 | 11/2001 | Lin et al. | |
| 6,363,182 B2 | 3/2002 | Mills et al. | |
| 6,430,328 B1 | 8/2002 | Culver et al. | |
| 6,480,645 B1 * | 11/2002 | Peale et al. | 385/18 |
| 6,628,856 B1 * | 9/2003 | Costello et al. | 385/18 |
| 6,636,683 B2 * | 10/2003 | Morimoto et al. | 385/140 |
| 6,678,436 B2 * | 1/2004 | Lemoff | 385/16 |
| 6,697,553 B2 * | 2/2004 | Bhardwaj et al. | 385/37 |
| 6,701,037 B2 * | 3/2004 | Staple et al. | 385/18 |
| 6,713,742 B2 * | 3/2004 | Mandella et al. | 250/201.3 |
| 6,728,016 B1 * | 4/2004 | Hunt et al. | 359/223 |
| 6,757,453 B2 * | 6/2004 | Nekado et al. | 385/14 |
| 6,785,437 B2 * | 8/2004 | Hagood et al. | 385/16 |
| 2001/0006569 A1 | 7/2001 | Lin | |
| 2002/0048423 A1 * | 4/2002 | Frick et al. | 385/10 |

* cited by examiner

*Primary Examiner*—Thien M. Le
*Assistant Examiner*—Edwyn Labaze

(57) ABSTRACT

An optical cross-connect switch includes a switching mirror, a lens mount for securing an optical fiber collimating lens so that a light path from the optical fiber collimating lens is in an alignment relative to the switching mirror and a second lens, and an actuator. The actuator is connected to the switching mirror. The actuator comprises a flexure, and a mechanical motion amplifier. The switching mirror is attached to the mechanical motion amplifier in a thermally stable manner. Mechanical motion of the actuator is damped using a damping fluid. Repeatability of actuator motion is provided for switching the switching mirror into and out of the light path.

40 Claims, 16 Drawing Sheets

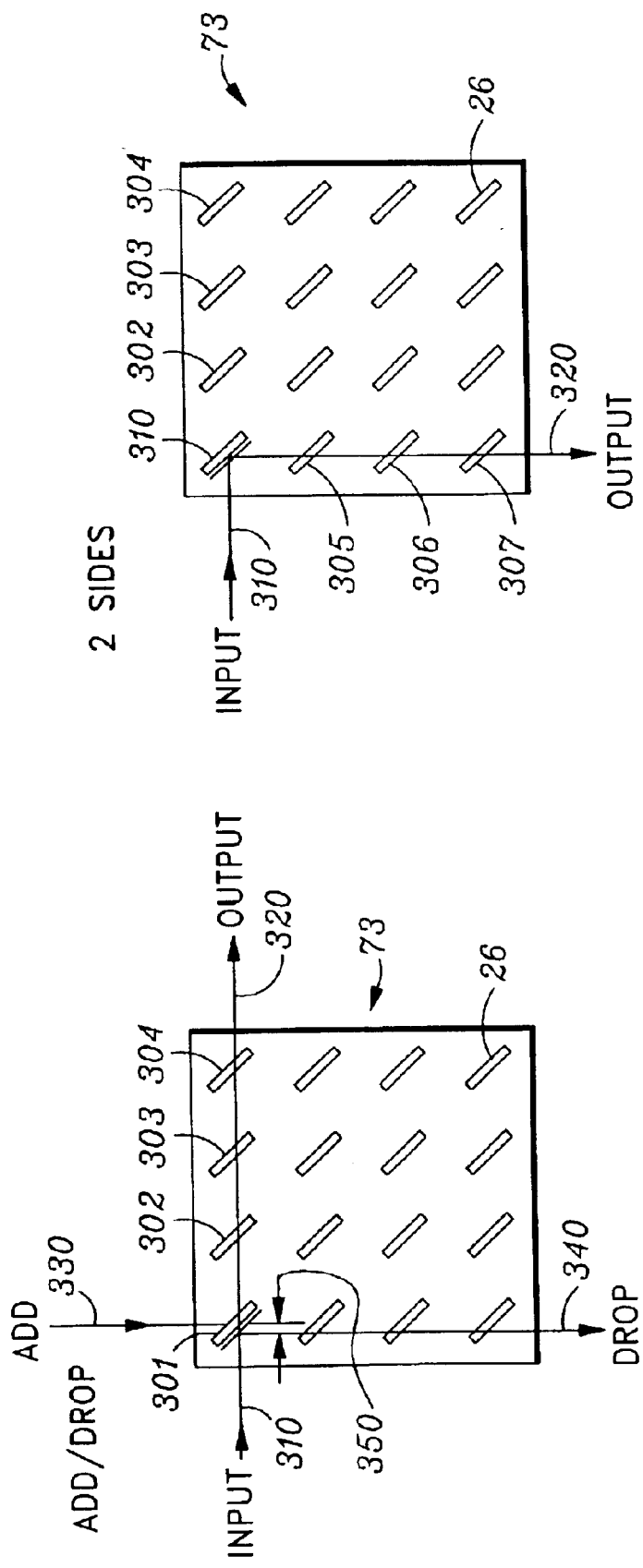

2-D OPTICAL SWITCH WITH LENS MOUNT

CROSS-REFERENCE TO RELATED APPLICATIONS

This application claims the benefit of U.S. Provisional Application No. 60/387,091, filed Jun. 7, 2002.

BACKGROUND OF THE INVENTION

The present invention generally relates to fiber optic communications and, more particularly, to a 2-dimensional, mechanical, fiber optical cross-connect switch.

Fiber optical cross-connect switches find wide application in communications, for example, in the telecommunications industry, where fiber optical switches may be used for metro and long haul services using dense wavelength division multiplexing (DWDM). DWDM is a technology that uses multiple lasers and transmits several wavelengths of light simultaneously over a single optical fiber. Each signal travels within its unique color band, which is modulated by the data (text, voice, video, for example). DWDM enables the existing fiber infrastructure of the telephone companies and other carriers to be dramatically increased. DWDM systems exist that can support more than 150 wavelengths, each carrying data at rates up to 10 billion bits per second (Gbps). Such systems can provide more than 1,000 Gbps of data transmission on one optical fiber.

Conventional fiber optical cross-connect switches that connect optical fiber lines are electro-optical. Such conventional switches convert photons from the input side to electrons internally in order to do the signal switching electronically and then convert back to photons on the output side. Such conventional switches may typically be used, for example, in a central office core router of a telecommunications network. By way of contrast, an all-optical fiber-optical cross-connect switch is a switching device that maintains the signal as light from input to output. Although some vendors call electro-optical switches "optical switches," true optical switches, i.e., all-optical switches, support all transmission speeds. Unlike electronic switches, which are tied to specific data rates and protocols, all-optical switches direct the incoming data bit stream to the output port no matter what the line speed or protocol (such as internet protocol (IP), asynchronous transfer mode (ATM), or synchronous optical network (SONET)) and do not have to be upgraded for any changes to the protocol.

An optical switch is a device that switches a small and collimated beam of light in free space either to be passed through a location unaffected or to be reflected in a different direction at the location. The switching can be done mechanically by moving a mirror between two distinct and stable positions—in the path of the light, and out of the path of the light. An optical cross-connect switch may allow light to be routed between optical fibers in such a way that any optical fiber from one side of the switch can be optically connected to any of the optical fibers on another side of the switch. If all of the optical paths within the switch are in the same plane and at the same time all actuators within the switch can only be in either ON or OFF position, the cross-connect switch is referred to as being 2-dimensional. For example, a 2-dimensional optical cross-connect switch can be implemented with a planar array of mirrors for switching light, as described above, between optical fibers. For such an implementation to be usable, all the mirrors within the switching mirror array must be able to remain parallel to each other in order to permit individual alignment of collimating lenses for the optical fibers connected to the switch. At the same time it is preferable for the switch to have uniformity of optical insertion loss that varies less than 1 decibel (dB). Additionally, the switch should have low optical insertion loss and yet be economical to manufacture. Furthermore the switch may be subject to various industry standards such as Telcordia GR-1221, Generic Reliability Assurance Requirements for Passive Optical Components, and GR-1073, Generic Requirements for Fiber Optic Switches, both published by Bellcore, Bell Communications Research.

U.S. Pat. No. 5,841,917 issued to Jungerman et al. discloses an optical cross-connect switch incorporating a pin grid actuator to selectively position mirrors relative to light beams in the switch. Due to the inherent rotatability of the pins, it is difficult to provide precise parallel alignment of the mirrors. Furthermore, the vertical translation movement of the pins used for positioning and repositioning the mirrors provides poor repeatability for parallel alignment of the mirrors due also to the inherent rotatability of the pins.

As can be seen, there is a need for an optical cross-connect switch in which the mirrors can be precisely aligned and which has excellent repeatability for precise repositioning of the mirrors. Also, there is a need for an optical cross-connect switch with excellent repeatability for parallel alignment of the mirrors that meets industry standards such as Telcordia GR-1221 and GR-1073.

SUMMARY OF THE INVENTION

In one aspect of the present invention, an optical cross-connect switch includes a switching mirror, a lens mount for securing an optical fiber collimating lens, and an actuator. A light path from the optical fiber collimating lens is aligned relative to the switching mirror and a second lens; and the actuator is connected to the switching mirror so that the switching mirror is switched into and out of the light path.

In another aspect of the present invention, an optical cross-connect switch includes a switching mirror, an actuator connected to the switching mirror so that the switching mirror is switched into and out of a light path, and a lens mount. The lens mount secures an optical fiber collimating lens. The lens mount comprises a hole with a uniform boundary for providing a thermally stable attachment for the optical fiber collimating lens. The hole is at a 45-degree angle to a reflecting surface of the switching mirror so that the light path from the optical fiber collimating lens is maintained in an alignment relative to the switching mirror and a second lens.

In still another aspect of the present invention, an optical cross-connect switch includes a switching mirror, a lens mount for securing an optical fiber collimating lens so that a light path from the optical fiber collimating lens is in an alignment relative to the switching mirror and a second lens, and an actuator. The actuator is connected to the switching mirror. The actuator comprises a flexure and a mechanical motion amplifier. The switching mirror is attached to the mechanical motion amplifier in a thermally stable manner. Mechanical motion of the actuator is damped using a damping fluid. Repeatability of actuator motion is provided for switching the switching mirror into and out of the light path.

In yet another aspect of the present invention, a communication system comprises a fiber optic terminating in an optical fiber collimating lens, and a cross-connect switch. The cross-connect switch includes a switching mirror, a lens mount, and an actuator. The lens mount secures the optical fiber collimating lens. The lens mount comprises a first hole with a uniform boundary for providing a thermally stable attachment for the optical fiber collimating lens, such that the first hole is at a 45-degree angle to a reflecting surface of the switching mirror. A light path from the optical fiber collimating lens is maintained in an alignment relative to the switching mirror and a second lens, where the lens mount comprises a second hole, the second hole and the first hole defining an axis of the lens mount, and the second hole and the first hole are at a 45-degree angle to the axis. The lens mount is disposed so that every light path in the cross-connect switch is of equal length to every other light path. The actuator is connected to the switching mirror, and includes a flexure. The actuator includes a mechanical motion amplifier and the switching mirror is attached to the mechanical motion amplifier in a thermally stable manner. Mechanical motion of the actuator is damped using a damping fluid. Repeatability of actuator motion is provided for switching the switching mirror into and out of the light path.

In a further aspect of the present invention, a method for optically switching light beams includes moving a switching mirror into and out of a light path using an actuator having a flexure.

These and other features, aspects and advantages of the present invention will become better understood with reference to the following drawings, description and claims.

BRIEF DESCRIPTION OF THE DRAWINGS

FIGS. 2D, 2E, 2F, and 2G are top diagrammatic views, similar to FIG. 2A, showing alternative configurations for operation of a 2-dimensional optical switch with lens mount, according to alternative embodiments of the present invention;

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides an optical cross-connect switch using switching mirrors in which the switching mirrors can be precisely aligned and which has excellent repeatability for precise repositioning of the mirrors. The cross-connect switch of the present invention can be used for switching optical signals in a fiber optic communication system. A cross-connect switch in accordance with one embodiment could be used, for example, in a central office core router of a telecommunications network. In one embodiment, mirrors within the switching mirror array can be set parallel to each other within one hundred arc second, permitting individual alignment of collimating lenses for optical fibers directed toward the mirrors in the switching mirror array. The present invention also provides an optical cross-connect switch with excellent repeatability for parallel alignment of the mirrors. Repeatability refers to the ability of the switch to maintain the precise parallel alignment of the switching mirrors when in a light path, despite moving the mirrors in and out of the light paths within the switch. Furthermore, the present invention provides an optical cross-connect switch that conforms to industry standards including both Telcordia GR-1221 and GR-1073.

Figure 1A:
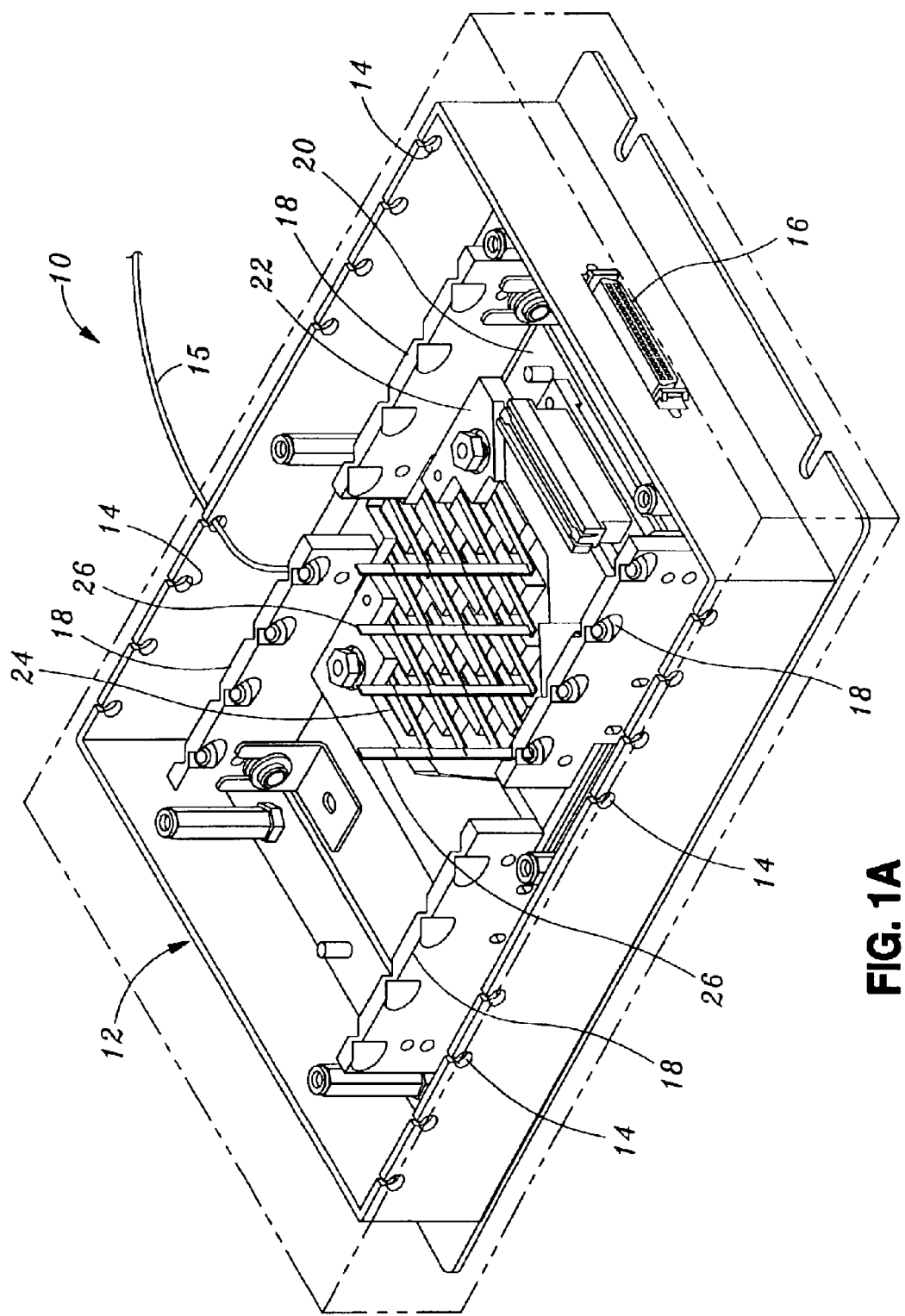
FIG. 1A is a perspective view of a 2-dimensional optical switch with lens mount, according to one embodiment of the present invention.

Referring now to FIG. 1A, optical cross-connect switch 10, in accordance with one embodiment, is illustrated. Optical cross-connect switch 10 may include chassis mounting box 12, which may serve as a protective enclosure and provide a stable mounting for the components of optical cross-connect switch 10. Chassis mounting box 12 may include holes 14 to guide and secure optical fibers 15 to optical cross-connect switch 10. Chassis mounting box 12 may further include an electrical connector 16 for providing power and actuation and mirror position signals, for example, to optical cross-connect switch 10. Optical cross-connect switch 10 may further include lens mounts 18, printed circuit board 20, base plate 22, actuators 24, and switching mirrors 26, as described in more detail below.

Figure 1B:
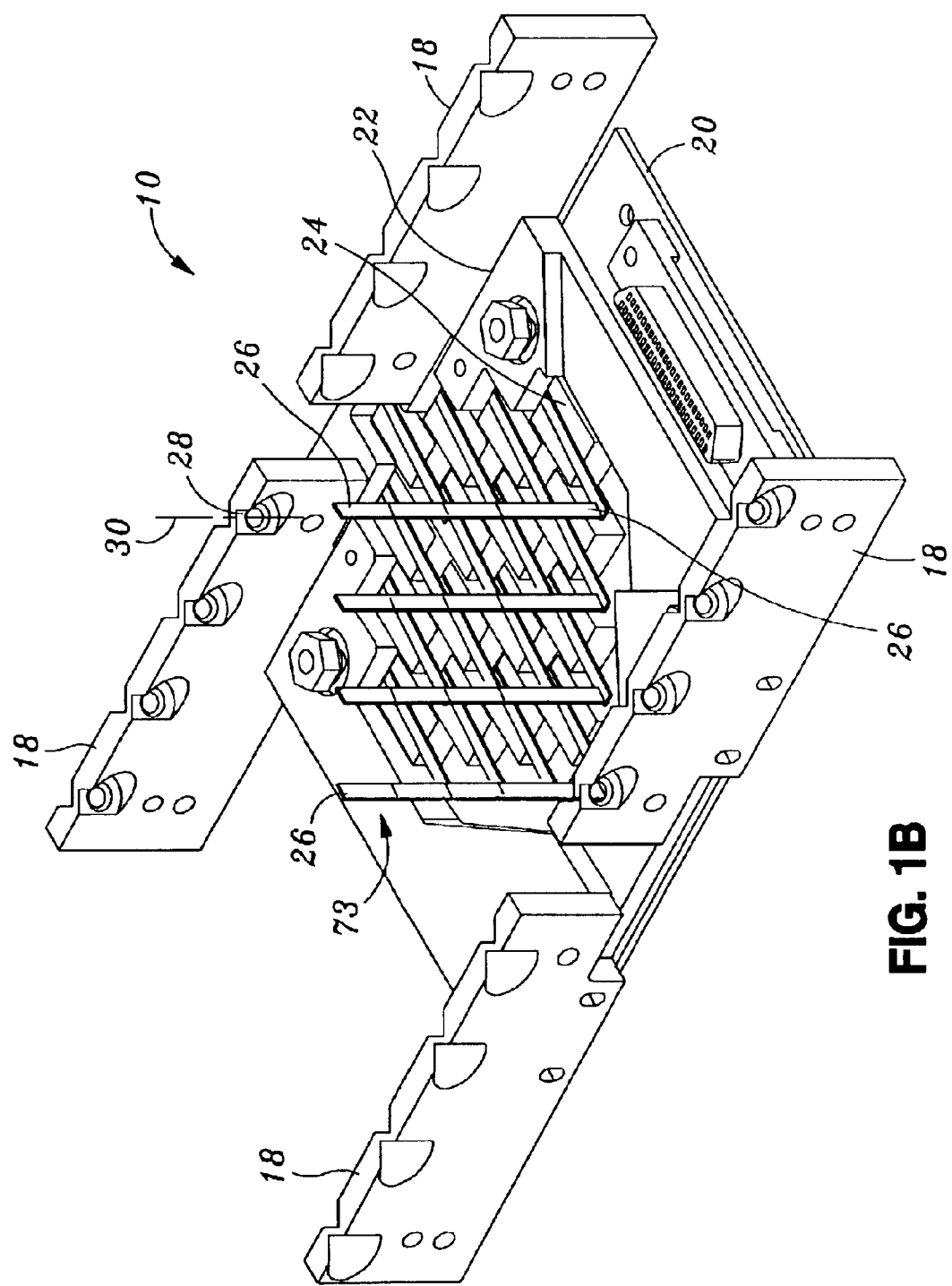
FIG. 1B is a perspective view, similar to that of FIG. 1 but with a chassis mounting box removed for clarity, of a 2-dimensional optical switch with lens mount, according to one embodiment of the present invention.
Figure 2A:
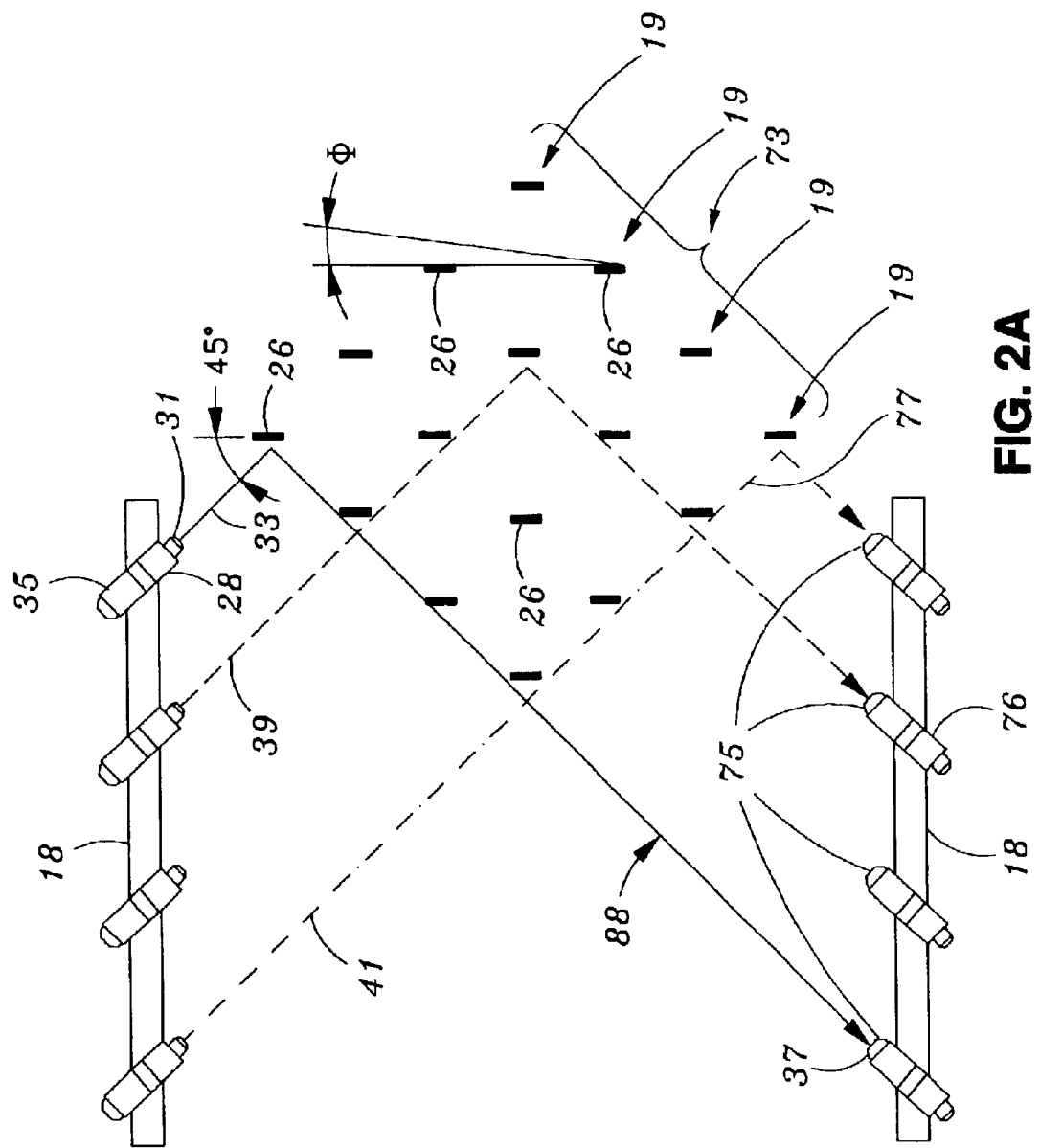
FIG. 2A is a top diagrammatic view of a 2-dimensional optical switch with lens mount, according to an embodiment of the present invention.

Referring now to FIG. 1B, the optical cross-connect switch 10 of FIG. 1A is shown without the chassis mounting box 12. As illustrated, lens mounts 18 may include mounting holes 28 disposed at a 45-degree angle to the plane of switching mirrors 26, i.e., a central axis 30 of hole 28 intersects a plane of the flat reflecting surface of mirror 26 at a 45-degree angle. An optical fiber collimating lens, or collimator 31 of any well known design, may be mounted in each hole 28, as illustrated in FIG. 2A, so as to provide a light path 33 at a 45-degree angle to the plane of switching mirrors 26 as seen in FIG. 2A. For example, a C-collimator may be used as a collimator for optical fibers. Collimator 31 may include a glass capillary, as known in the art, surrounding the end of the optical fiber and surrounding the collimating lens for holding the end of the optical fiber in proximity to the collimating lens. Collimator 31 may further include a metal soldering sleeve surrounding the glass capillary. Preferably, collimator 31 has a glass capillary only, without its metal soldering sleeve. An optical fiber pig-tail 35, which refers to the combination of the end of the optical fiber, the glass capillary, and collimating lens, with or without metal soldering sleeve, can be approximately 900 micrometers ($\mu$m) in diameter to ease handling of the optical fiber during assembly. Other diameters, however, are contemplated.

The optical fiber collimating lens, i.e., collimator 31, may be placed in an alignment to provide a light path reflecting from mirror 26 into a second optical fiber collimating lens, for example, collimator 37, as seen in FIG. 2A. The arrangement of switching mirrors 26 as a diamond configuration in a horizontal plane as seen from the top in FIG. 2A, with the planar reflecting surfaces of switching mirrors 26 perpendicular to the horizontal plane, i.e., vertical, as more clearly illustrated in FIG. 1B, may allow all the switching mirrors 26 within the switching mirror array 73 to be aligned with their planar reflecting surfaces parallel to each other within an arc second, as exemplified by angle $\phi$, which may be less than one hundred arc seconds, as illustrated in FIG. 2A. The high degree of precision in parallel alignment of switching mirrors 26 may permit individual alignment of collimating lenses. For example, collimator 31 may be individually aligned with collimator 37, as known in the art, to provide light path 33 as seen in FIG. 2B.

By arranging switching mirrors 26 and lens mounting holes 28 at 45-degree angles, as shown in FIG. 2A, all of the light paths through the switch from one lens to another can be made of equal length. For example, light paths 33, 39, and 41, are all the same length, as shown in FIG. 2A. Achieving uniformity of optical insertion loss may be facilitated by providing equal length optical paths so that uniformity of optical insertion loss to within 1 decibel (dB) may be provided.

Figure 2B:
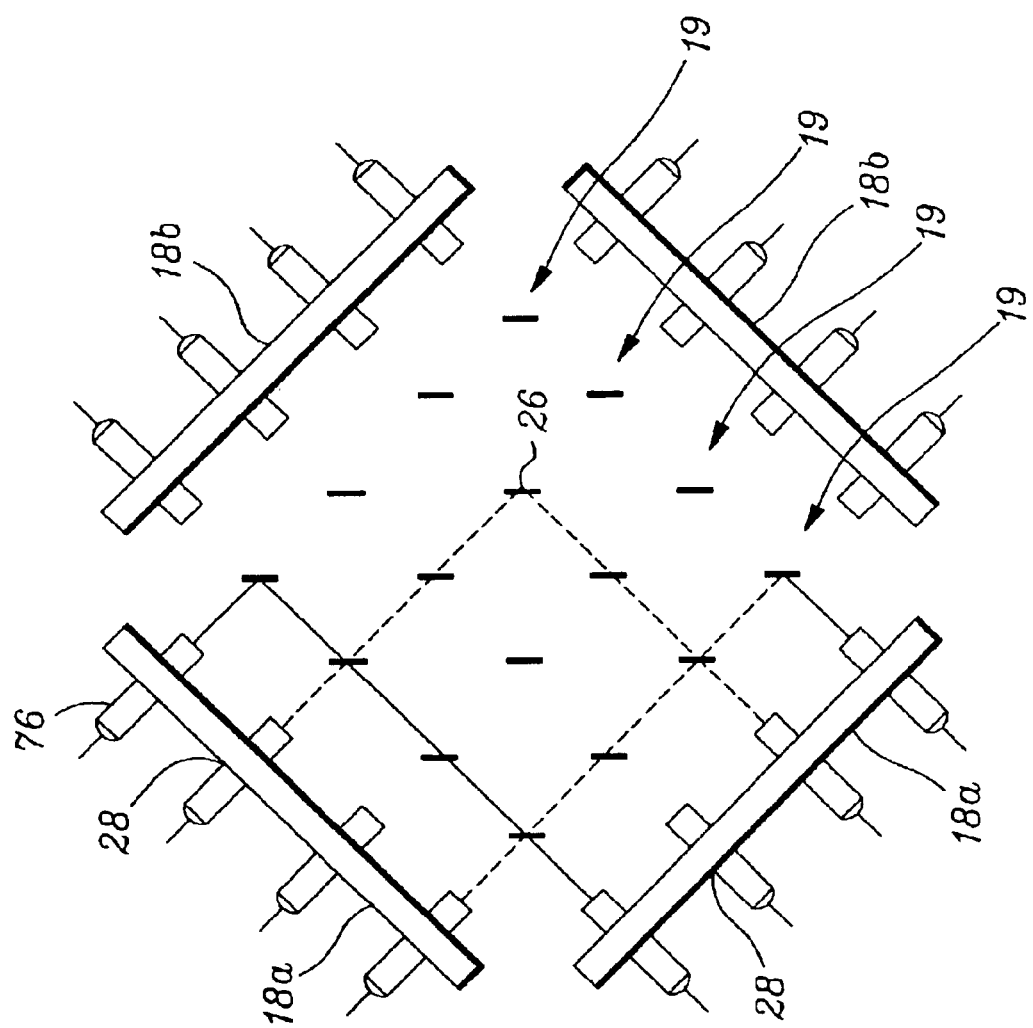
FIG. 2B is a top diagrammatic view, similar to FIG. 2A, showing an alternative configuration of a 2-dimensional optical switch with lens mount, according to an embodiment of the present invention.

Alternatively, when it is considered less important for all of the light paths through the switch from one lens to another to be made of equal length, lens mounts 18a may be provided so that lens mounting holes 28 are disposed at 90-degree angles, as shown in FIG. 2B. Also, as shown in FIG. 2B, additional lens mounts 18b may be provided in order to use double-sided mirrors 26, as also exemplified by the embodiment shown in FIGS. 1A and 1B. One-sided mirrors 26 also may be employed (in the absence of additional lens mounts such as lens mounts 18b) as exemplified by the embodiment shown in FIG. 2A.

Figure 2C:
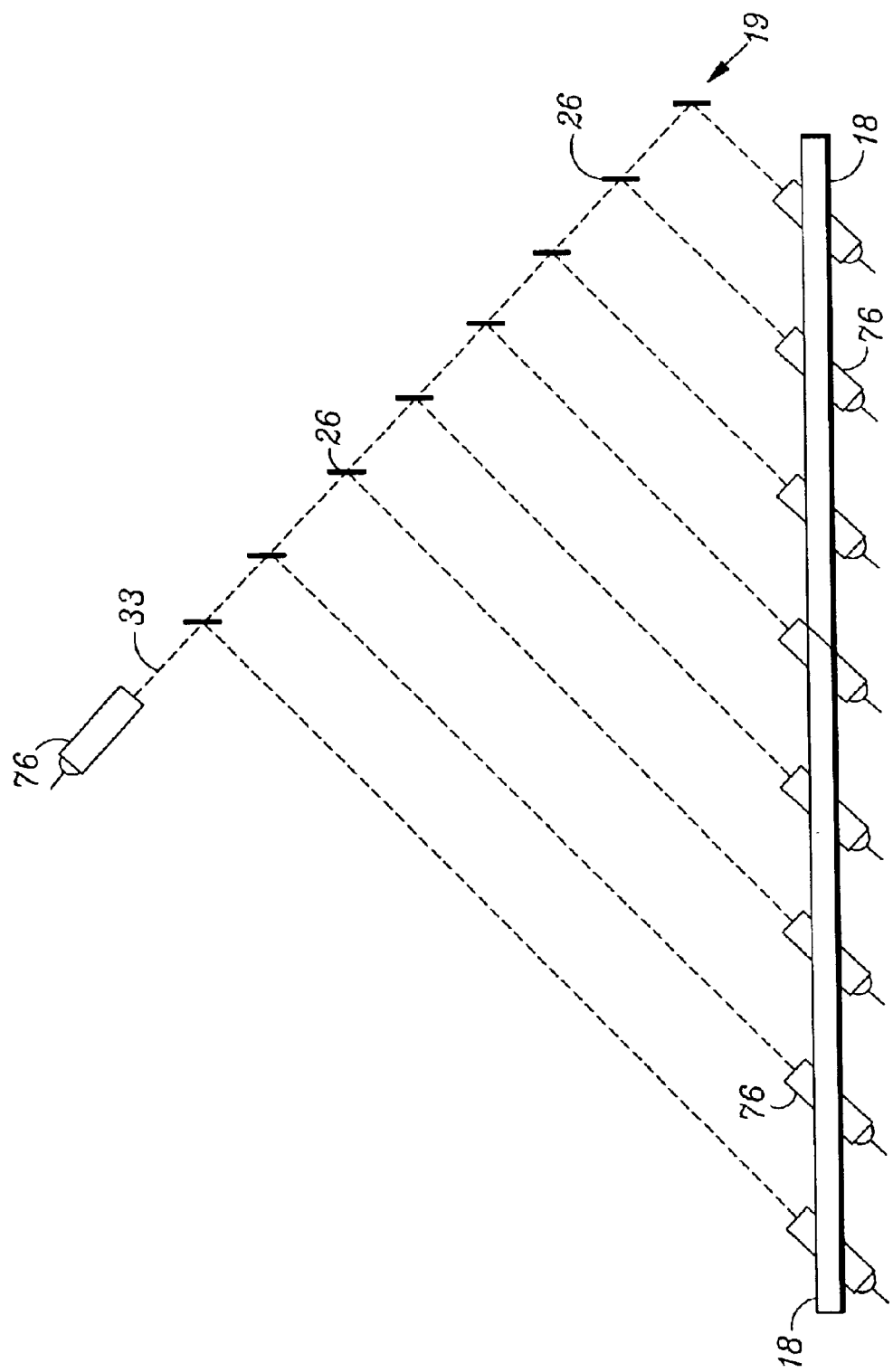
FIG. 2C is a top diagrammatic view, similar to FIG. 2A, showing an alternative configuration of a 2-dimensional optical switch with lens mount, according to an embodiment of the present invention.

FIG. 2C illustrates an example of an alternative configuration for a 2D optical cross-connect switch according to one embodiment, in which there is one row 19 of mirrors 26, with eight mirrors 26 in row 19. By way of contrast, each of FIGS. 2A and 2B shows a configuration with four rows 19 with four mirrors 26 in each row 19. In general, a configuration of m rows of mirrors with n mirrors in each row (m may or may not be equal to n) is referred to as an m×n switch. Thus, FIG. 2A shows a 4×4 switch configuration according to one embodiment, FIG. 2B shows a 4×4 switch configuration according to an alternative embodiment, and FIG. 2C shows a 1×8 switch configuration according to another alternative embodiment. It is contemplated that the 2D optical cross-connect switch of the present invention may be embodied as any m×n configuration having practical values for m and n.

FIGS. 2D through 2G illustrate examples of alternative configurations for operation of a 2D optical cross-connect switch according to alternative embodiments.

FIG. 2D shows mirror array 73 of two-sided mirrors 26 configured for operation as an add/drop module, as further described below with reference to FIG. 6B. In operation, a light beam at input 310 may be passed unobstructed to output 320 when mirrors 301, 302, 303, and 304 are switched out of the light path. Add/drop operation may be performed when one of mirrors 301, 302, 303, and 304, for example, mirror 301 is switched into the light path, as illustrated in FIG. 2D. When mirror 301 is switched into the light path, a light beam at input 310 may be passed to drop output 340, and—with mirrors 302, 303, and 304 switched out of the light path—a light beam at add input 330 may be passed to output 320. Note that, due to the thickness of the two-sided mirrors 26, there is an offset 350 to alignment of add input 330 and drop output 340.

FIG. 2E shows mirror array 73 of one-sided mirrors 26 configured for two-sided operation, for example, as a cross-connect switch, as exemplified by the embodiment shown in FIG. 2A or (in the absence of additional lens mounts 18b) as exemplified by the embodiment shown in FIG. 2B. In operation, a light beam at input 310 may be passed unobstructed to output 320 when, for example, mirror 301 is switched into the light path, as illustrated in FIG. 2E and mirrors 305, 306, and 307 are switched out of the light path. Similarly, by switching any chosen one of mirrors 301, 302, 303, and 304 into the light path while switching out of the light path from input 310 any of mirrors 301, 302, 303, and 304 that remain in the light path from input 310, a light beam at input 310 may be passed unobstructed to any chosen output, as known in the art.

Figure 2G:
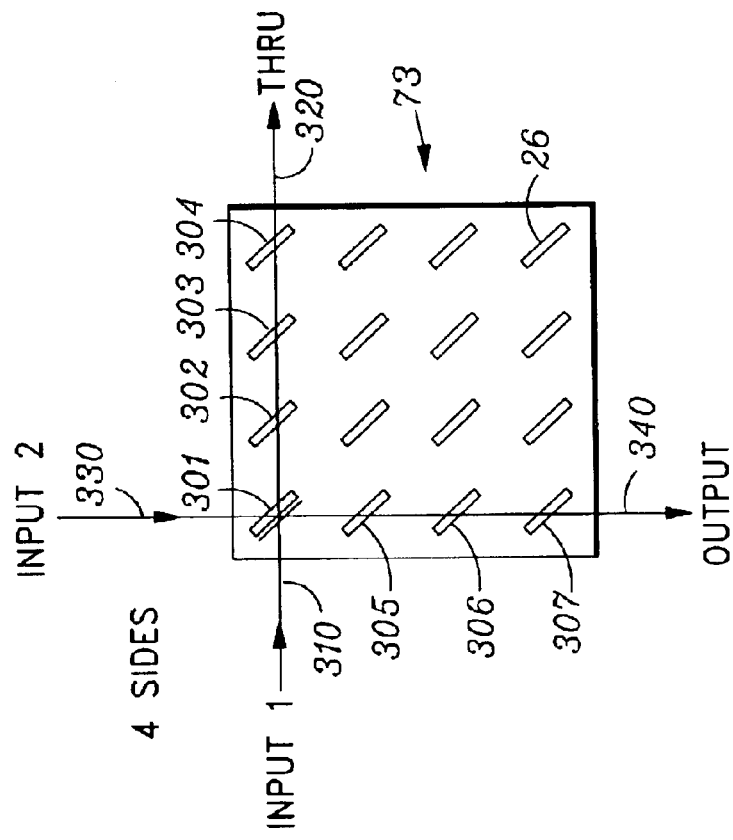
Figure 2F:
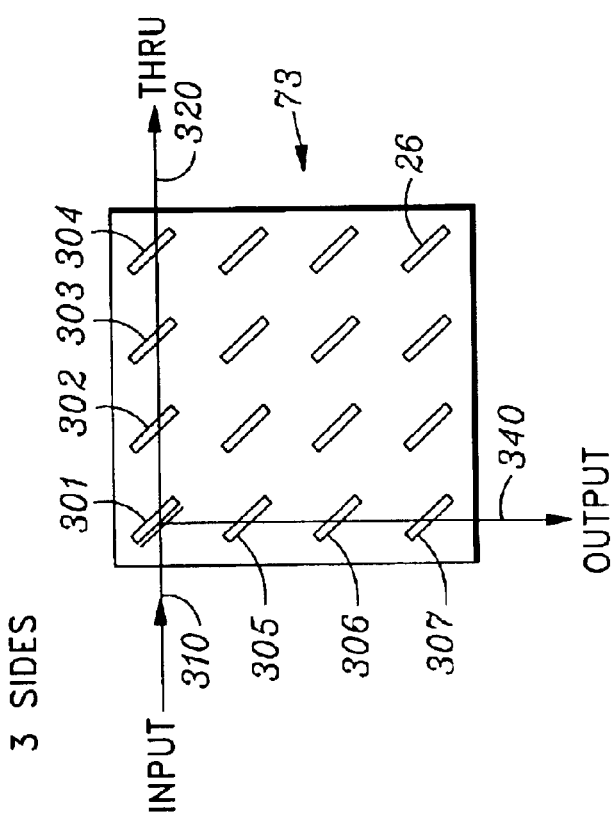

FIG. 2F shows mirror array 73 of one-sided mirrors 26 configured for three-sided operation. In operation, a light beam at input 310 may be passed unobstructed to output 340 when, for example, mirror 301 is switched into the light path and mirrors 305, 306, and 307 are switched out of the light path. Alternatively, a light beam at input 310 may be passed unobstructed to output 320 when, for example, mirror 301 is switched out of the light path and mirrors 302, 303, and 304 are also switched out of the light path. Similarly, by switching any chosen one of mirrors 301, 302, 303, and 304 into the light path while switching out of the light path from input 310 any of mirrors 26 that remain in the light path from input 310, a light beam at input 310 may be passed unobstructed to any chosen output, as known in the art.

FIG. 2G shows mirror array 73 of one-sided mirrors 26 configured for four-sided operation. In operation, a light beam at input 310 may be passed unobstructed to output 340 when, for example, mirror 301 is switched into the light path and mirrors 305, 306, and 307 are switched out of the light path. Alternatively, a light beam at input 310 may be passed unobstructed to output 320 when, for example, mirror 301 is switched out of the light path and mirrors 302, 303, and 304 are also switched out of the light path. In addition, when, for example, mirror 301 is switched out of the light path, a light beam at input 330 may be passed unobstructed to output 340 when mirrors 305, 306, and 307 are also switched out of the light path. Similarly, by switching any chosen one of mirrors 301, 302, 303, and 304 into the light path while switching out of the light path from input 310 any of mirrors 26 that remain in the light path from input 310, a light beam at input 310 may be passed unobstructed to any chosen output, as known in the art.

Figure 3:
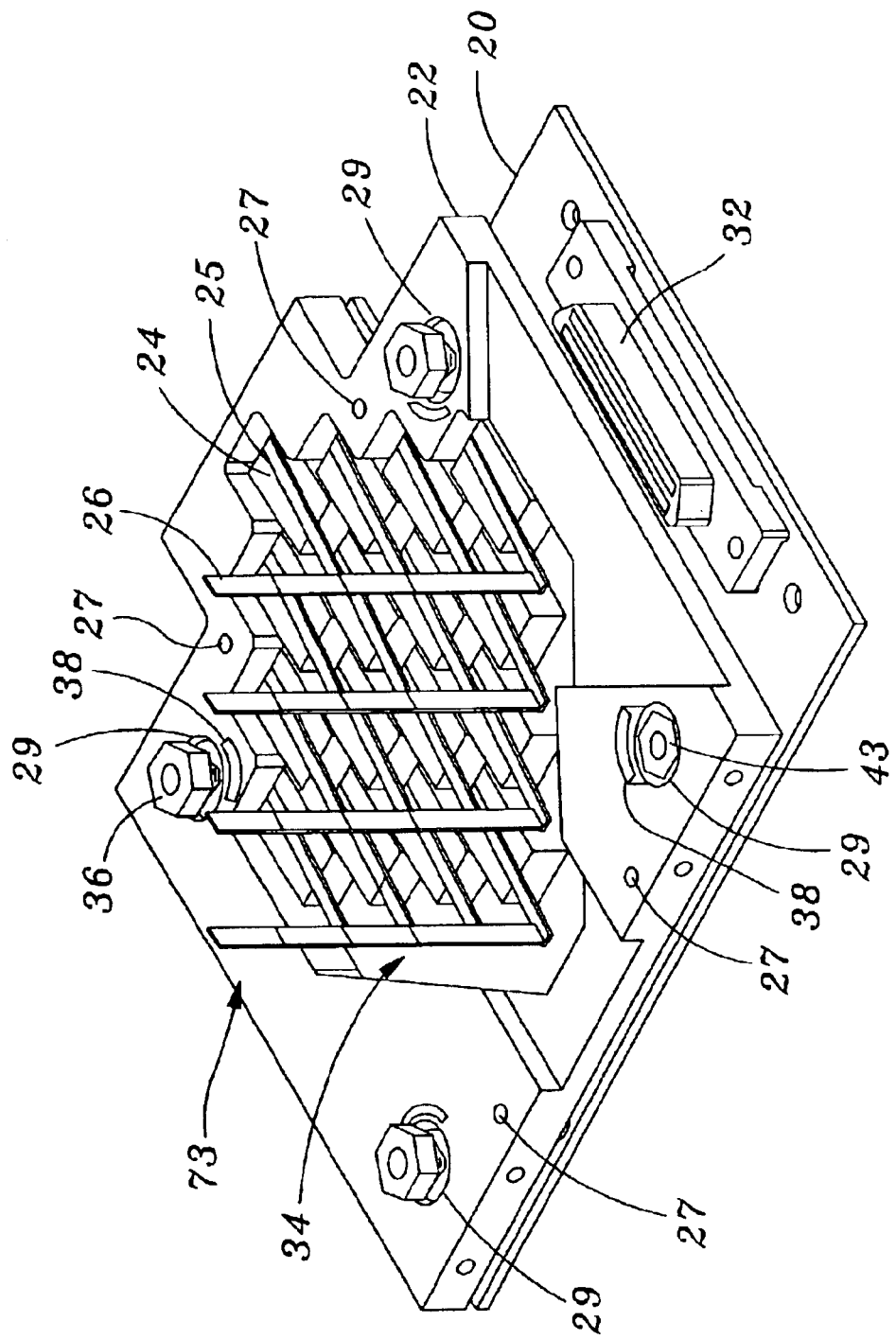
FIG. 3 is a perspective view of the embodiment shown in FIGS. 1A and 1B but with lens mounts removed for clarity, of a 2-dimensional optical switch.

Referring now to FIG. 3, optical cross-connect switch 10, in accordance with the above embodiment, excluding lens mounts 18 is illustrated. Printed circuit board 20 may include electrical connector 32 for providing power and actuation signals, for example, to optical cross-connect switch 10. Actuators 24 may be arranged as a diamond in a horizontal plane as seen from the top, so that switching mirrors 26, each one connected to an actuator, can also be arranged in a diamond in a horizontal plane as seen from the top with the planar reflecting surfaces of the switching mirrors 26 perpendicular to the horizontal plane, i.e., vertical, as described above with reference to FIG. 2B. Each actuator 24 may comprise an electrical relay 25. Each relay 25 may be individually glued on to base plate 22 and soldered individually to printed circuit board 20. Alignment of relays 25, both in terms of their height with respect to printed circuit board 20 and in terms of their horizontal position within a diamond arrangement, as described above, may be accomplished by inserting relay pins into or through soldering holes on printed circuit board 20. Printed circuit board 20 may provide electrical connection and rough positioning for relays 25, but may not provide mechanical stability for relays 25.

Mechanical stability for relays 25, i.e., actuators 24, may be provided by base plate 22. Base plate 22 may be fabricated, for example, of an aluminum or stainless steel piece with a recessed center portion 34 to accommodate the array of relay actuators 24. The surface of base plate 22 may have two sets of holes 27 and 29. One set of holes 27 may be used for attaching printed circuit board 20 to the bottom of base plate 22. A second set of mounting holes 29, may be used for mounting base plate 22 using a nut and bolt type fastener 36, for example, to chassis mounting box 12. A quarter-turn through-cut 38 may be made outside of each mounting hole 29, between mounting hole 29 and recessed center portion 34 of base plate 22, i.e., between mounting hole 29 and the array 73 of switching mirrors 26 and actuators 24. Through-cuts 38 may provide isolation from stress transmitted by fastener 36, for example, from chassis mounting box 12 when base plate 22 is mounted to chassis mounting box 12. Stress transmitted by fastener 36 could occur, for example, under deformation of chassis mounting box 12 during drop testing. Mounting holes 29 may also be mill half-recessed. Mill half-recessed mounting holes 29 may allow the nuts or screws holding base plate 22, such as fastener 43, to be recessed under the top surface of base plate 22, as seen in FIG. 3, in order to minimize the distance between the mirror mounts 52 and the edge of any jig which may be used for mounting, aligning, and gluing the mirrors to the mirror mounts, thereby reducing the overall length 54 of switching mirrors 26.

Figure 4A:
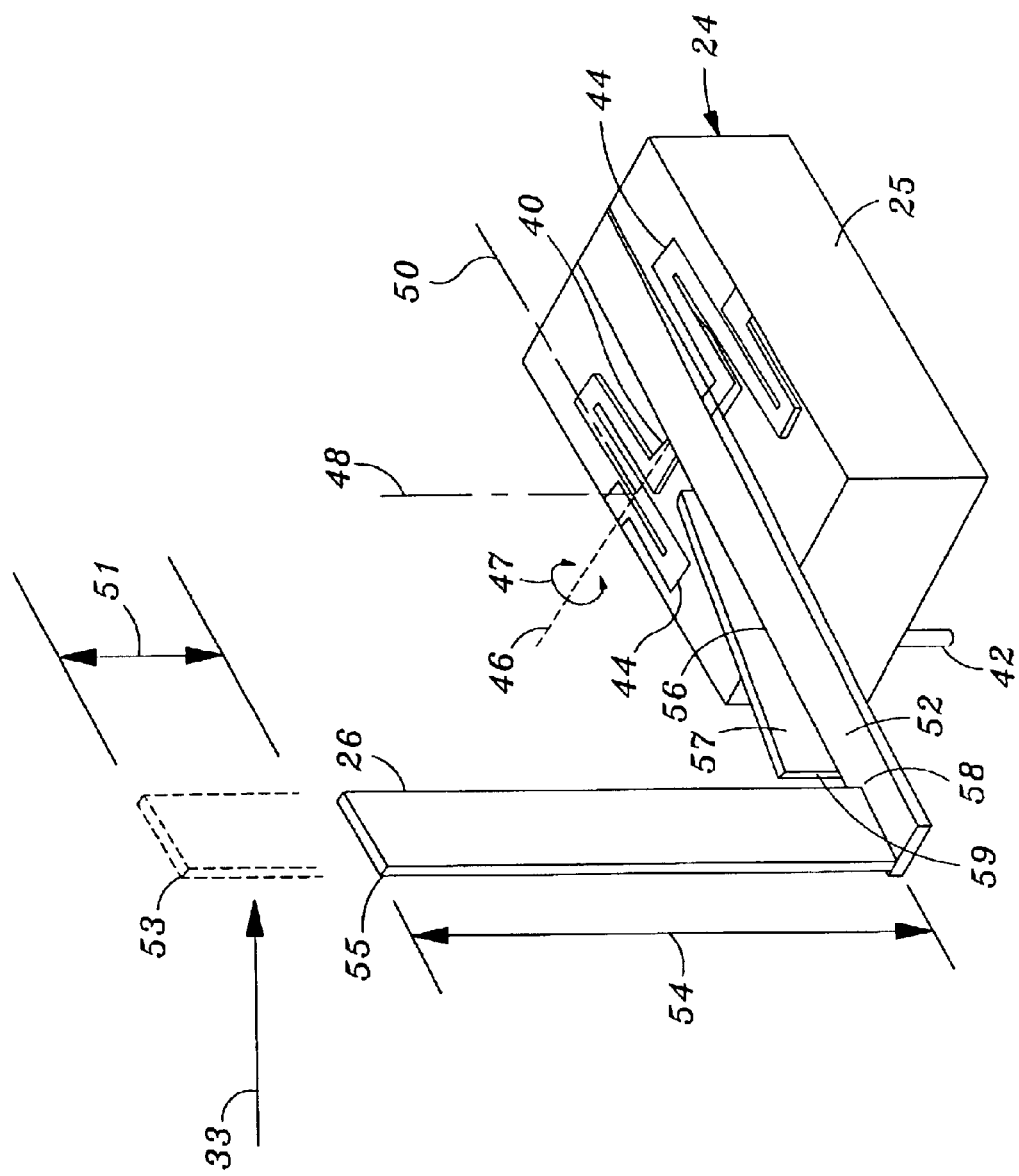
FIG. 4A is a perspective view of an actuator and mirror for a 2-dimensional optical switch with lens mount, according to one embodiment of the present invention.
Figure 4B:
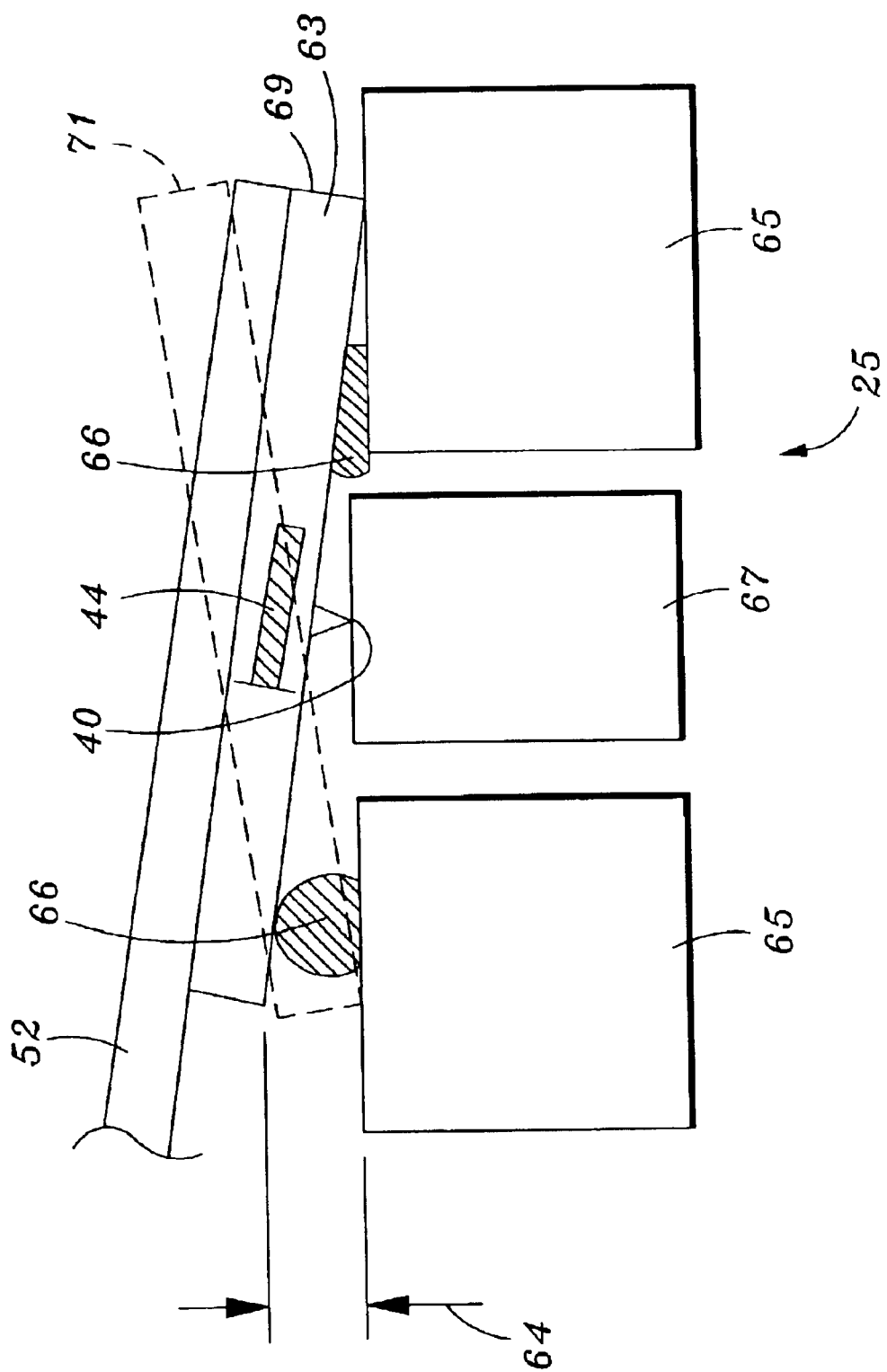
FIG. 4B is diagrammatic view of a relay according to the embodiment shown in FIG. 4A.
Figure 4C:
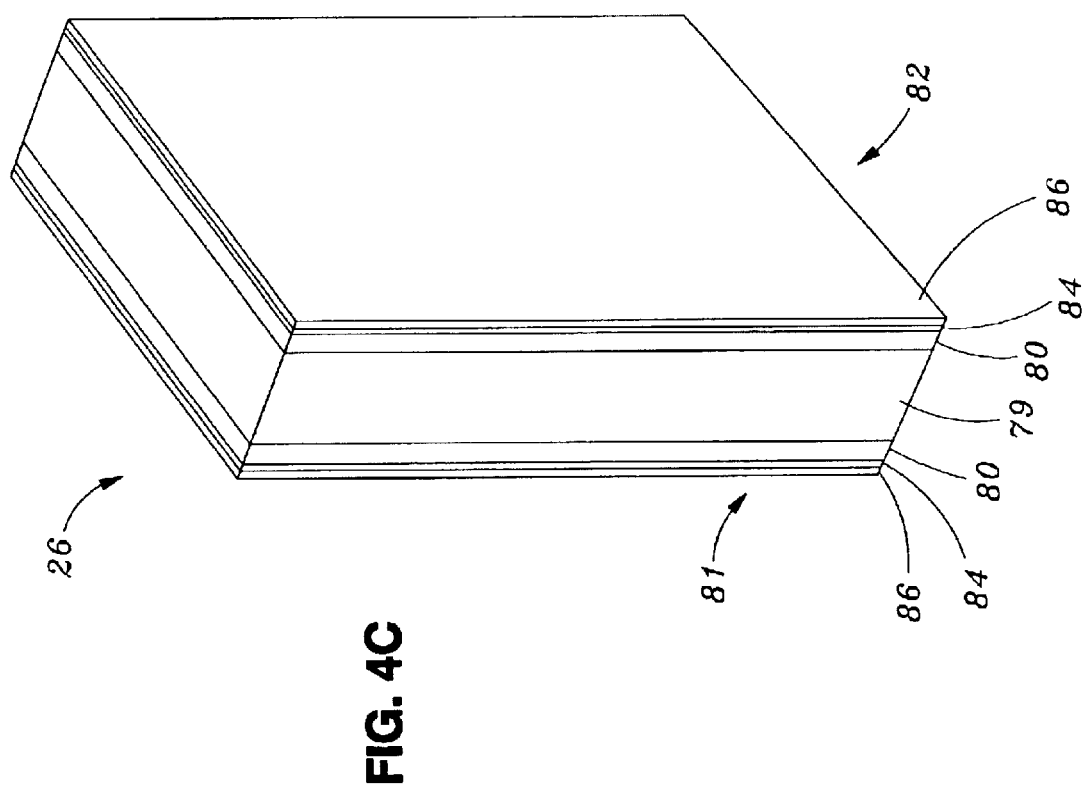
FIG. 4C is a perspective view of a mirror according the embodiment shown in FIG. 4A.

Referring now to FIGS. 4A, 4B, and 4C, an actuator 24 and mirror 26 for optical switch 10, according to one embodiment, are illustrated. Actuator 24 may comprise a miniature electromechanical relay 25, for example, of a type commercially available from Omron, Inc. or Aromat, Inc. The relay may include a cantilever magnetic armature 63 resting on a pair of magnetic circuit loops 65. A permanent magnet 67 may be used at the fulcrum 40 of armature 63 to provide a latching action. The actuation voltage may be, for example, 5 volts. Electrical contacts 42 may also be provided by the relay to indicate the position of armature 63. Armature 63 may be hinged in the middle by a pair of metal flexures 44. For example, flexures 44 may include copper or other suitable metal as manufactured by Omron, Inc. or Aromat, Inc. Flexures 44 may provide flexibility for rotation 47 of armature 63 about horizontal fulcrum axis 46 while providing resistance to motion about vertical axis 48 and horizontal axis 50. The lack of mechanical friction in flexure 44 may allow high repeatability of mechanical motion between two distinct positions 69, 71 of armature 63. Repeatability may be described as the ability of armature 63 and switching mirror 26 to return to an original position and may be measured as the variation of light power due to misalignment of the switching mirror 26 relative to light paths, for example, light path 33, in the array 73 of switching mirrors 26, as seen in FIG. 2B. The repeatability of relay 25 with flexure 44 acting as actuator 24 over 1 million cycles can be better than 1.0 dB.

Figure 7:
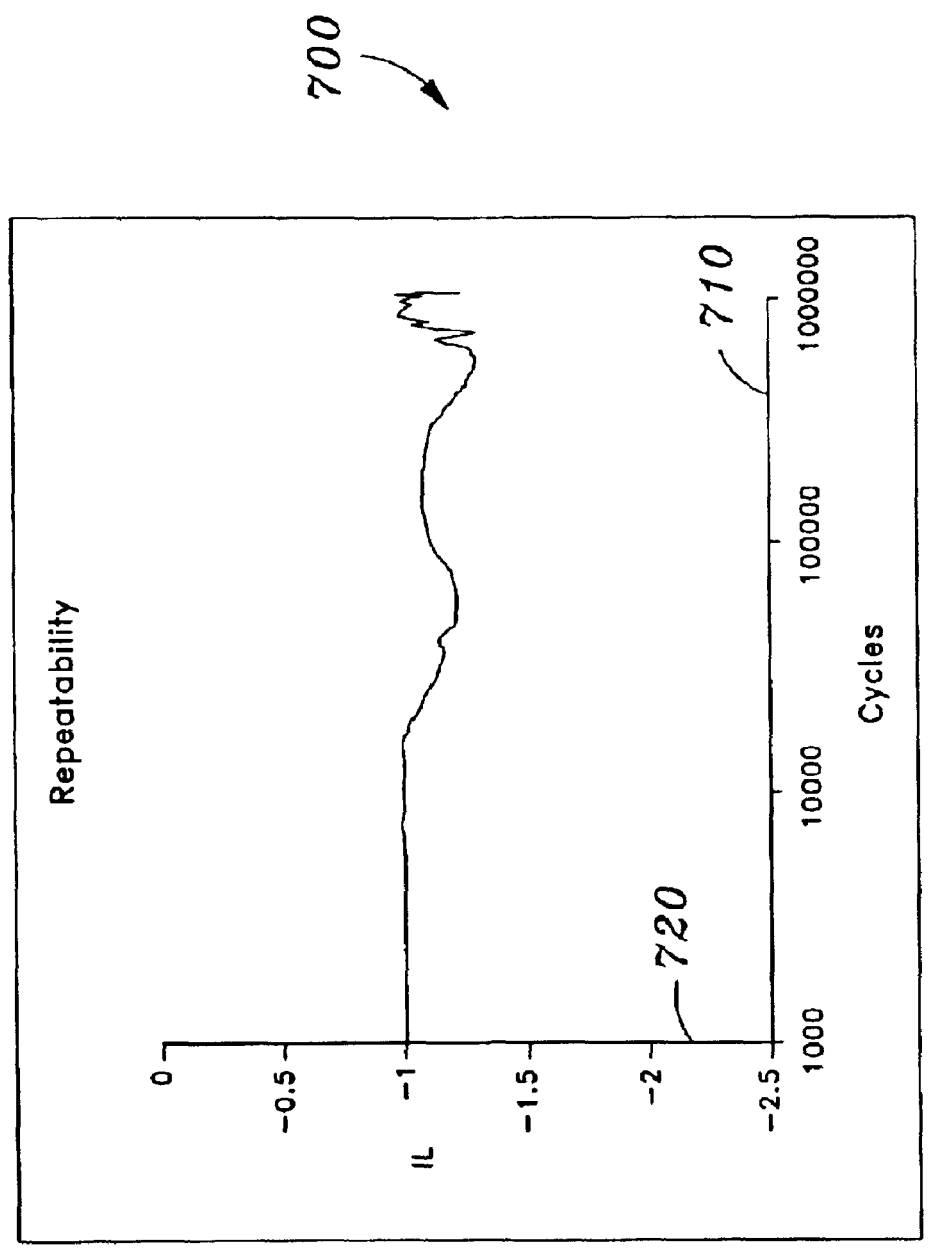
FIG. 7 is a graph illustrating insertion loss repeatability test data for a 2-dimensional optical switch with lens mount, according to an embodiment of the present invention.

For example, graph 700 shown in FIG. 7A illustrates test data for repeatability of one embodiment. The horizontal scale 710 of graph 700 shows the number of test cycles, each cycle being a motion of relay 25 between positions 69 and 71. The vertical scale 720 of graph 700 shows the insertion loss (IL), which may be generally understood as the loss of light power in the light path due to, for example, misalignment of the switching mirror. Insertion loss may occur, for example, as loss of light power from collimator 31 on light path 33 upon reinsertion into collimator 37. As shown in graph 700, the variation of insertion loss may be less than 0.25 dB within 1 million cycles. In particular, the variation of insertion loss may be less than 0.1 dB within the first 25,000 cycles.

Actuator 24 may include a mirror mount 52, as shown in FIG. 4A, which may be, for example, a strip of metal such as stainless steel or aluminum, for connecting mirror 26 to actuator 24. Mirror mount 52 may be attached to the top of relay armature 63 of actuator 24. Mirror mount 52 may serve as a mechanical motion amplifier. For example, the magnetic gap 64 of relay 25 may be only about 0.4 millimeters (mm), and the optical beam diameter may be about 0.9 mm. By making mirror mount 52 sufficiently long, the 0.4 mm motion of mirror mount 52 between positions 69 and 71 above the magnetic gap 64 of the relay may be increased to greater than 0.9 mm motion near the end of mirror mount 52 where mirror 26 attaches, thus providing amplification of the armature motion. Mirror mount 52 may allow mirror 26 to pop up to position 53 or down to position 55, into, position 53, or out of, position 55, the optical beam, or light path 33. The length 54 of mirror 26 may also by used to amplify the mirror swing distance 51 in a manner similar to the amplification provided by making mirror mount 52 sufficiently long. The total mirror swing distance 51 may have about a 20% margin over the optical beam diameter.

The lengthwise edge 56 of mirror mount 52 may be folded as shown in FIG. 4A so that mirror mount 52 may have an L-shaped cross-section, for example, to increase the strength of mirror mount 52. The folded portion 57 of edge 56 should stop, at edge 59, before reaching the mounting point 58 for mirror 26. Stopping folded portion 57 at edge 59 before reaching mounting point 58 may present a flat surface on mirror mount 52 for attaching switching mirror 26 to mirror mount 52 with glue, for example, while preventing the glue from wicking between mirror 26 and the folded portion 57 of edge 56. Glue wicking between mirror 26 and the folded portion 57 of edge 56 can seriously degrade the switch's thermal performance by providing a non-uniform or uneven expansion and contraction of glue surrounding switching mirror 26 where switching mirror 26 attaches to mirror mount 52. The flat surface surrounding mounting point 58, as shown in FIG. 4A, may allow switching mirror 26 to be evenly and uniformly attached to a flat portion of mirror mount 52 for providing a thermally stable, i.e., uniformly contracting and expanding with change in temperature, attachment of mirror 26 to mirror mount 52.

Optical switching time provided by relay actuator 24 may be very short, even with the additional weight of mirror mount 52 and mirror 26, on the order of between 1 and 10 milliseconds. Once relay actuator 24 completes switching, however, mirror 26 itself may vibrate for another 100 milliseconds or more (as an example) before the vibrations are damped out. For synchronous optical network (SONET) applications, it is preferred to have optical switching time much less than 50 milliseconds. Thus, to shorten switching time, it can be important to reduce the mirror vibration damping time. A damping fluid 66, such as oil or other damping fluids known in the art, may be used to fill the magnetic gap 64 of the relay, as shown in FIG. 4B, to improve damping. Although the relay switching time is lengthened, damping time can be reduced to about 5 to 10 milliseconds.

As shown in FIG. 4C, mirror 26 may comprise a silicon wafer 79 polished to a specific thickness, for example, 400 um may typically be used. Wafers 79 may be made optically flat, for example, by polishing using optical polish. The silicon wafers may have better than quarter-wave specification, as understood in the art, when diced into mirror strips. Silicon wafer 79 may be coated with gold coating 80 from about 100 to 200 Angstroms thick, for example, to form mirror surfaces on both sides 81, 82 of silicon wafer 79. Gold coating 80 may be protected with a dielectric coating 84 to minimize scratches from cleaning. Silicon wafer 79 may be subsequently diced into the appropriate size by a dicing saw. A second protective coating 86 may be used to protect the protected gold surface from getting scratched by the cutting shavings, making the job of cleaning the diced silicon wafers much simpler.

Figure 5A:
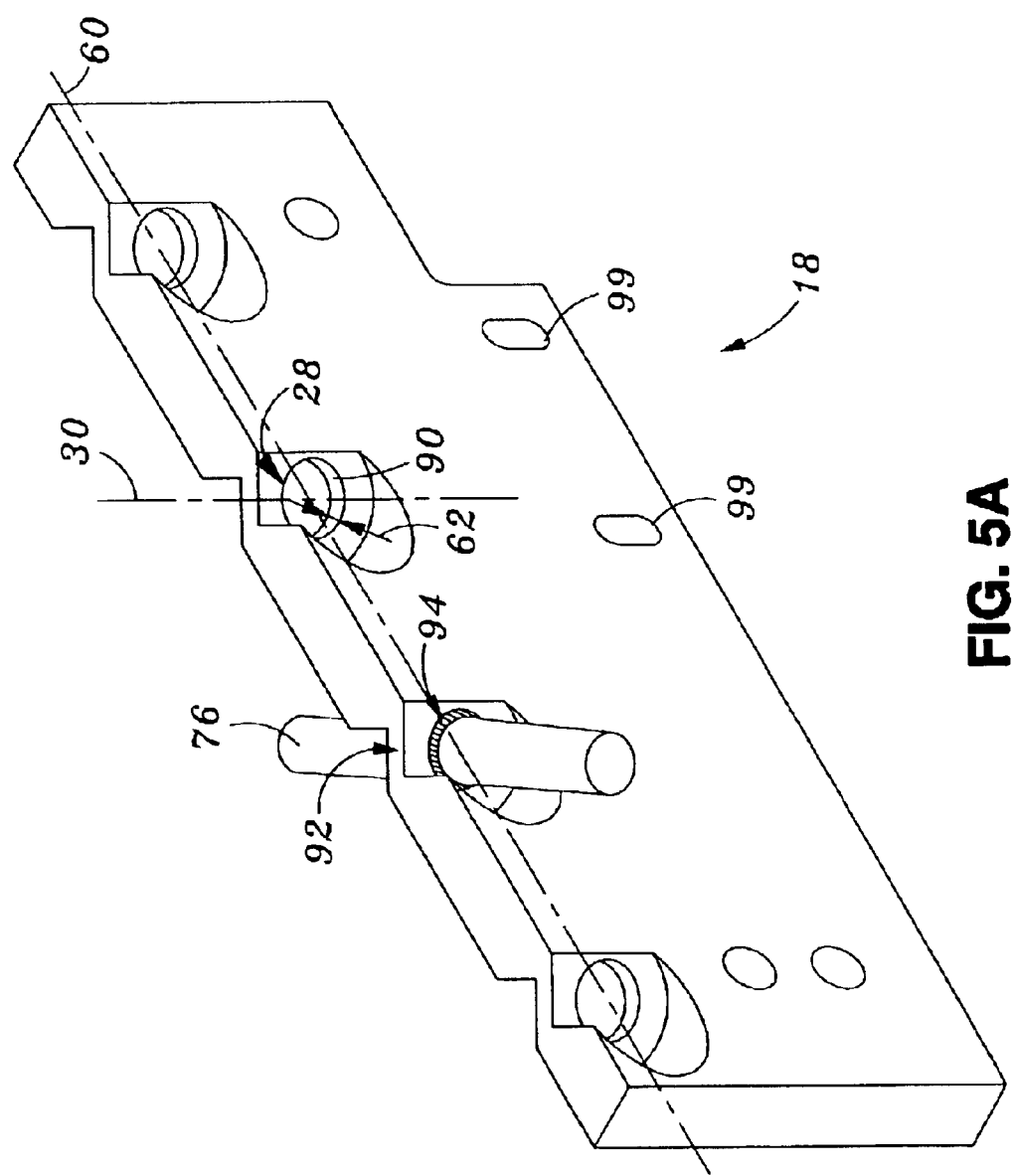
FIG. 5A is a perspective view of a lens mount for a 2-dimensional optical switch with lens mount, according to one embodiment of the present invention.
Figure 5B:
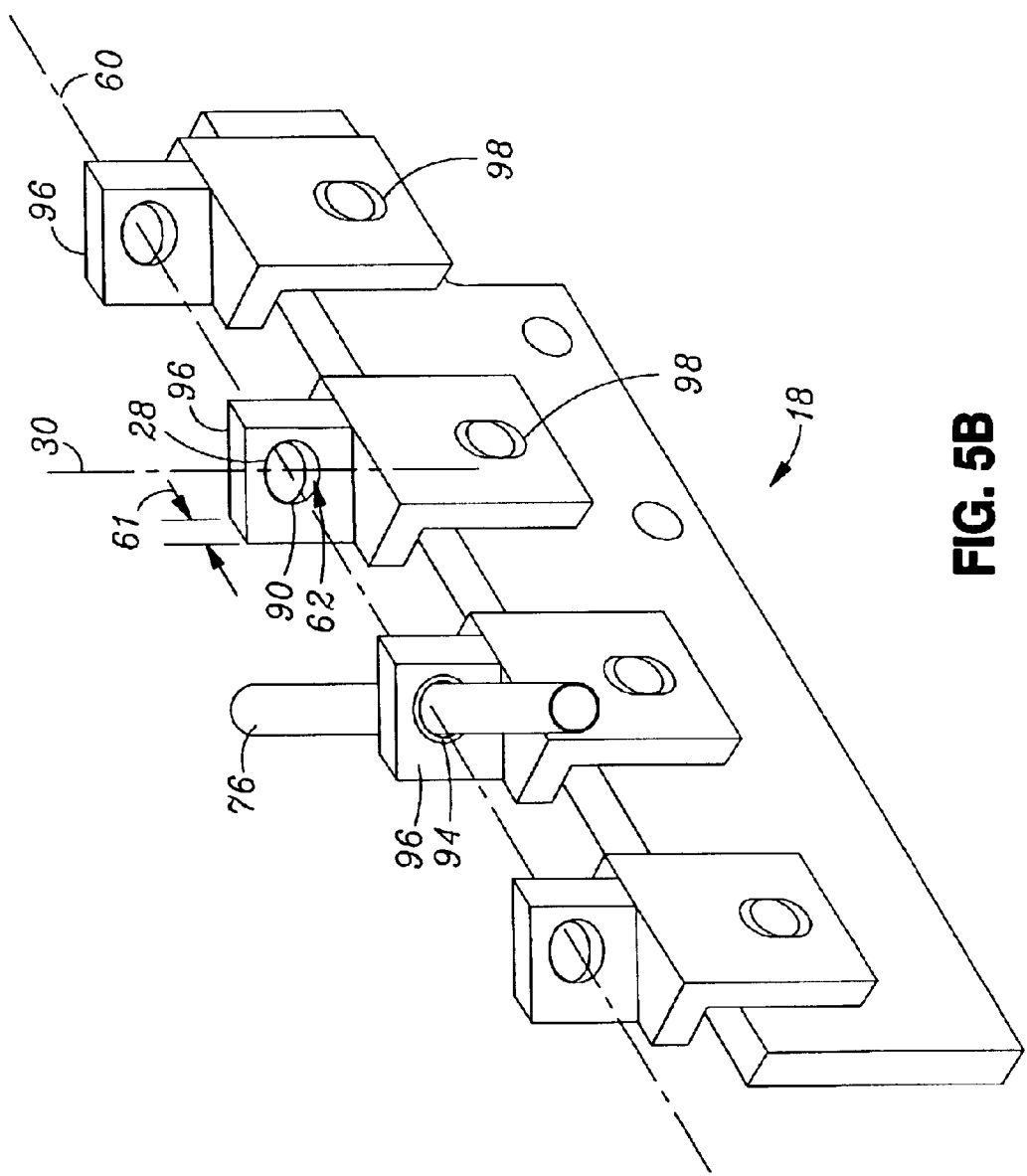
FIG. 5B is a perspective view of an alternative lens mount to the lens mount shown in FIG. 5A.

Referring now to FIGS. 5A and 5B, alternative lens mounts 18 for optical switch 10, according to the above embodiment, are illustrated. An array 75 of collimator lenses may be mounted in mounting holes 28 as shown in FIG. 2A. The centers of any two mounting holes 28 may determine a lens mount axis 60, as seen in FIGS. 5A and 5B. A central axis 30 of each mounting hole 28 may be disposed at a 45-degree angle to the lens mount axis 60. Each collimator lens 76 of array 75 may be mounted so that the light path, for example, light path 33 (shown in FIG. 2A), from the collimator lens 76 is parallel to central axis 30, i.e., the array 75 of collimator lenses may be mounted so that lens mount axis 60 may be at a 45-degree angle with respect to the edge 77, for example, of the switching mirror array 73 to obtain equal optical path length, for example, the total length 88 of light path 33 between collimator 31 and collimator 37, for all combinations of light paths, for example, light paths 33, 39, and 41. Since the collimator lenses 76 are mounted at an angle to lens mount axis 60 of lens mount 18 and angular accuracy of the collimator lenses is critical to optical insertion loss, the glue point 90 on lens mount 18 can be sensitive to twisting over a large temperature range. To alleviate the problem of having a slanted mounting port, i.e., a simple cylindrical hole drilled at an angle through lens mount 18 having an elliptical intersection with the surface of lens mount 18 and a non-uniform depth as measured perpendicular to the surface of lens mount 18, for the collimators, a "zig-zag" pattern 92 is created on lens mount 18, as seen in FIG. 5A. Alternatively, a flat piece of material of uniform depth 61 disposed at an angle to lens mount axis 60 may be provided, as exemplified by tombstones 96 shown in FIG. 5B. The zig-zag pattern 92, or alternatively tombstones 96, allow mounting holes 28 to each have a uniform boundary 62, i.e., mounting hole 28 may have a uniform depth all the way around the edge of mounting hole 28. Uniform boundary 62 may provide, for example, uniform wicking of glue around a collimator lens when the collimator lens is inserted in mounting hole 28. A uniform glue joint 94 between mounting hole 28 and the collimator lens may reduce the side force due to thermal expansion of glue, thus providing a thermally stable attachment of the collimator lens to lens mount 18. Slotted mounting holes 98 may be provided in tombstones 96 to improve the accuracy and the individual adjustability and ease of alignment of the collimator lenses 76. Alternatively, slotted mounting holes 99 may be provided in lens mount 18 to improve the accuracy, adjustability, and ease of alignment of the collimator lenses 76.

Figure 6A:
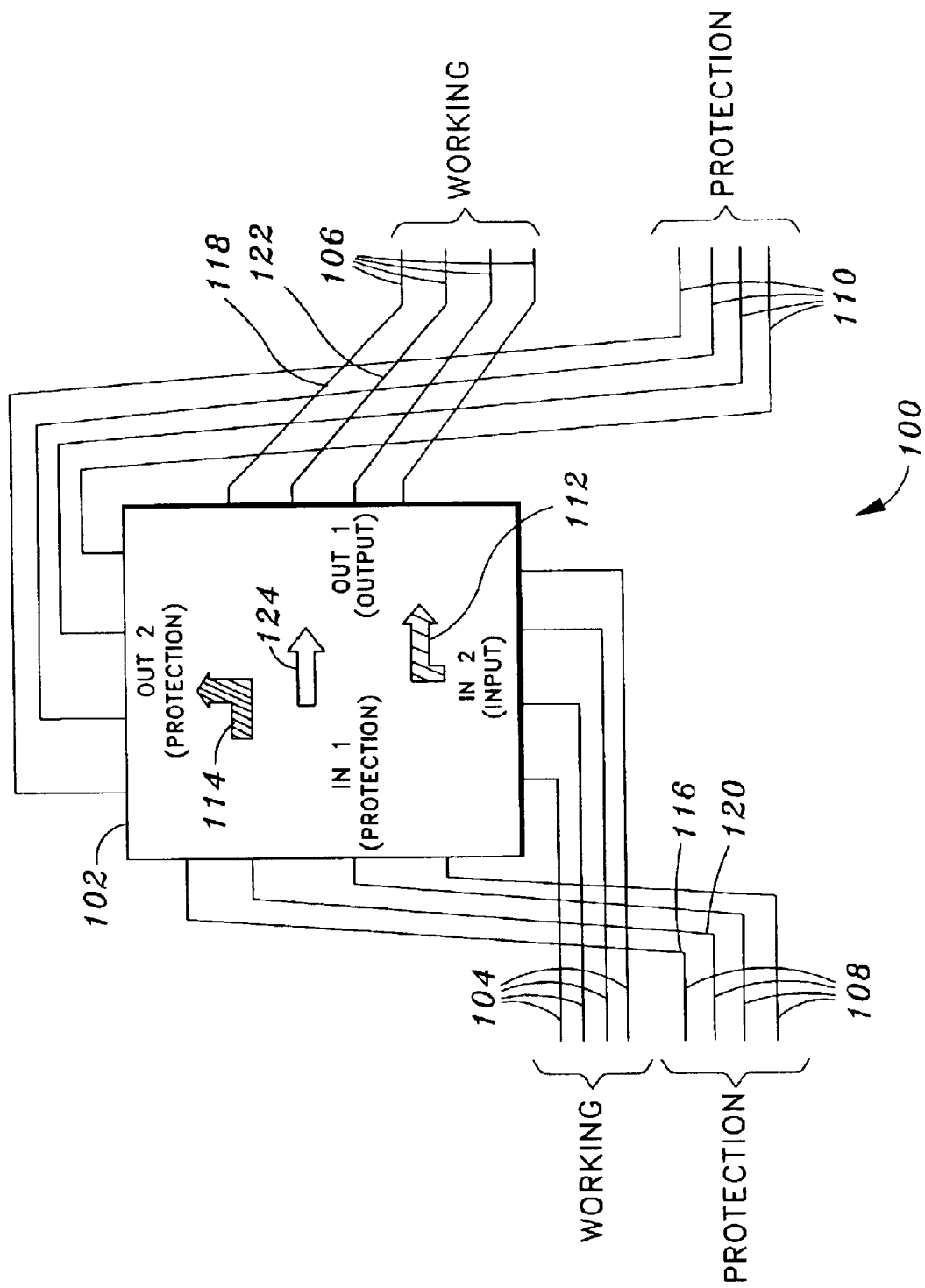
FIG. 6A is an architectural block diagram of a communication system using a 2-dimensional optical switch, in accordance with one embodiment of the present invention.

Referring now to FIG. 6A, exemplary communication system 100 is shown employing 2-dimensional optical switch 102 according to one embodiment. Switch 102 may comprise optical cross-connect switch 10, for example. Optical cross-connect switch 102 may have four working inputs 104 and four working outputs 106 comprising optical fibers for transmitting light signals. Switch 102 may have four protection inputs 108 and four protection outputs 110 comprising optical fibers for transmitting light signals. Because light can propagate in either direction along an optical fiber, the terms input and output are used for convenience and do not necessarily indicate the direction of signal propagation. Because switch 102 has four each of working and protection inputs and outputs, switch 102 is designated as a 4×4 switch. It is contemplated that any number of inputs and outputs could be provided so that, for example, an 8×8 switch could be provided and used as a protection switch in a similar manner.

By actuating switching mirrors of switch 102 into and out of the light paths, as described above for optical cross-connect switch 10, switch 102 may connect any of working inputs 104 to any of working outputs 106. In other words, any permutation of inputs 104 to outputs 106 may be provided. Connection of inputs 104 to outputs 106 in any combination, or permutation, is indicated by shaded arrow 112 in FIG. 6A. Because the mirrors are double-sided, protection inputs 108 may be connected to protection outputs 110 at the same time in a combination that is dependent upon the connection permutation of the working inputs 104 and outputs 106. Connection of protection inputs 108 to protection outputs 110 in a permutation dependent on the connection of working inputs 104 to working outputs 106, is indicated by shaded arrow 114 in FIG. 6A.

By switching all the mirrors out of a light path in switch 102, any of protection inputs 108 may be connected to a corresponding one of working outputs 106. For example, protection input 116 may be connected to working output 118, or protection input 120 may be connected to working output 122, and so on. Any corresponding pair of protection input 108 and working output 106, or any combination of corresponding pairs may be connected at one time as indicated by non-shaded arrow 124 in FIG. 6A. When used in the direction indicated by non-shaded arrow 124, switch 102 may be used as a protection switch to provide redundancy, or protection, for communication system 100 by substituting one of the protection inputs 108 for one of the working inputs 104.

When used in the direction indicated by shaded arrow 112, switch 102 may be used as a 4×4 non-blocking switch network, where "non-blocking", as understood in the art, means that any of working inputs 104 may be connected to any of working outputs 106 without blocking the possibility of any other working input 104 from being connected to an unused working output 106. When used in the direction indicated by shaded arrows 112 and 114, switch 102 may be used as an 8×8 blocking switch network., effectively doubling the capacity of switch 102 where blocking switching is acceptable.

Figure 6B:
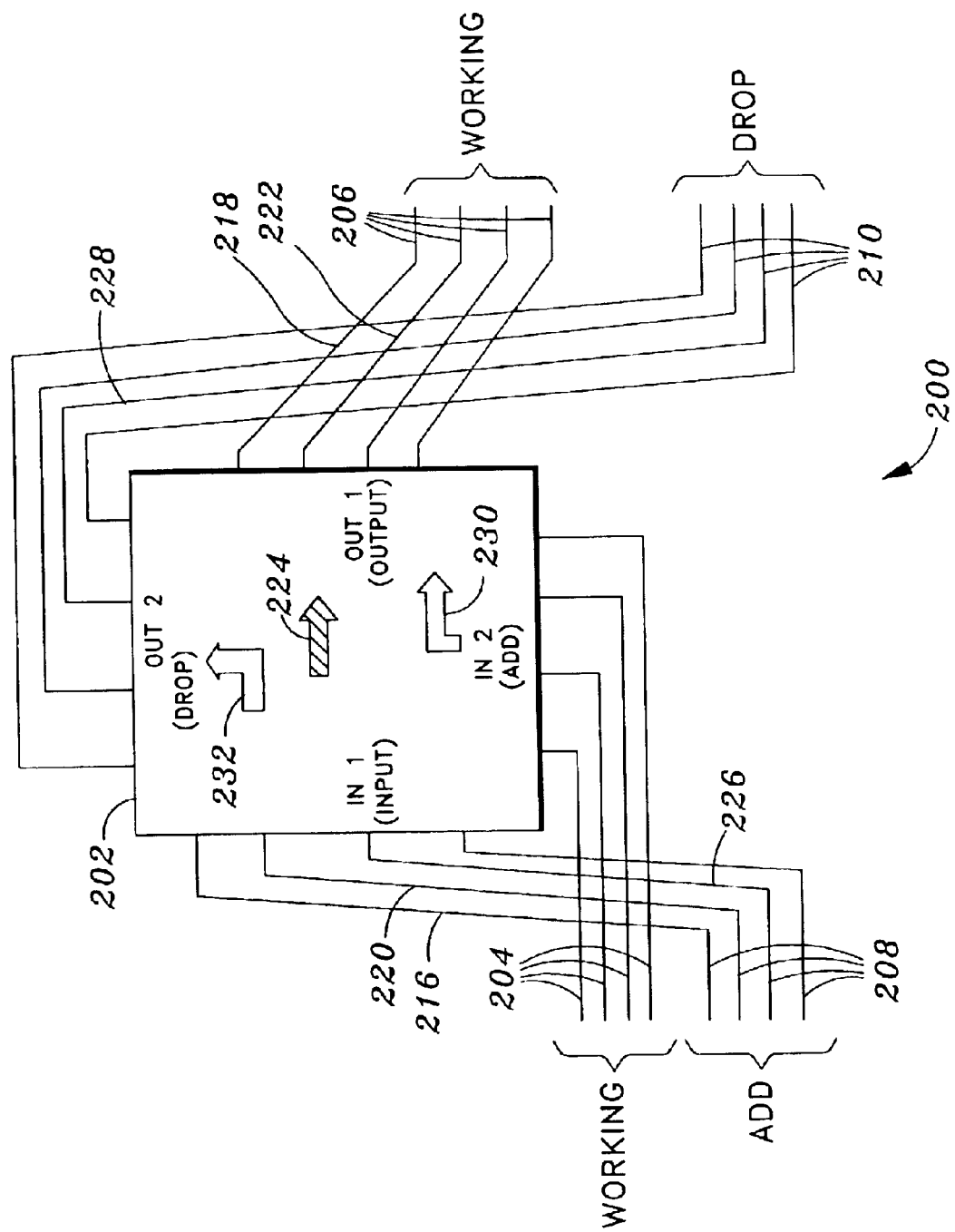
FIG. 6B is an architectural block diagram of an optical add/drop module using a 2-dimensional optical switch, in accordance with one embodiment of the present invention.

Referring now to FIG. 6B, exemplary add/drop module 200 is shown employing 2-dimensional optical switch 202 according to one embodiment. Switch 202 may comprise optical cross-connect switch 10, for example. Optical cross-connect switch 202 may have four working inputs 204 and four working outputs 206 comprising optical fibers for transmitting light signals. Switch 202 may have four add inputs 208 and four drop outputs 210 comprising optical fibers for transmitting light signals. Because light can propagate in either direction along an optical fiber, the terms input and output are used for convenience and do not necessarily indicate the direction of signal propagation. Because switch 202 has four each of working and add/drop inputs and outputs, switch 202 is designated as a 4×4 switch. It is contemplated that any number of inputs and outputs could be provided so that, for example, an 8×8 switch could be provided and used as an optical add/drop module in a similar manner.

By actuating switching mirrors of switch 202 out of the light paths, as described above for optical cross-connect switch 10, switch 202 may connect each of working inputs 204 to a corresponding one of working outputs 206. For example, working input 216 may be connected to working output 218, working input 220 may be connected to working output 222, and so on. All of the corresponding pairs of working inputs 208 and working outputs 206, or any combination of corresponding pairs may be connected at one time, as indicated by shaded arrow 224 in FIG. 6B.

By actuating an appropriate mirror to switch it into a light path, any of the add inputs 208 can be connected to any of the working outputs 206. For example, add input 226 may be connected to working output 222. Because the mirrors are double-sided, working input 222 may be connected to drop output 228 at the same time. Any permutation of connecting add inputs 208 to working outputs 206, along with its corresponding, dependent, simultaneous permutation of connecting working inputs 204 to drop outputs 210 may be provided. Connection of add inputs 208 to working outputs 206 in any combination, or permutation, is indicated by non-shaded arrow 230 in FIG. 6B. Connection of working inputs 204 to drop outputs 210 in a permutation that is dependent on the simultaneous connection of add inputs 208 to working outputs 206, is indicated by non-shaded arrow 232 in FIG. 6B. Thus, cross-connect switch 202 may be used to implement add/drop module 200 in an optical switching network.

A method of optically switching light beams may include moving a switching mirror 26 into and out of a light path 33 using an actuator 24. The method may be used, for example, for switching optical signals in a telecommunications system or fiber optic switching network. The method of switching may be used, for example, to implement a protection switch in a fiber optic communication system 100, or to implement an add/drop module 200 in an optical switching network.

The method may include using an actuator 24 comprising a relay 25 having a flexure 44 to provide repeatability, for example, less than 1 dB per million cycles. The method may further include securing optical fiber collimating lenses, or collimators 75, in lens mounts 18 in a thermally stable manner by providing lens mounts 18 which facilitate making uniform glue joints 94 between the collimators 75 and the lens mounts 18. By providing thermally stable mounting of collimators 75 in lens mounts 18, the light paths, for example, light path 33, from the optical fiber collimating lenses, for example, collimators 31, 37 may be maintained in an alignment relative to switching mirrors 26 despite temperature fluctuations. Switching mirror 26 may also be connected to actuator 24 in a thermally stable manner for improved repeatability despite temperature fluctuations. The method may further include damping mechanical motion of actuators 24 with a damping fluid 66 to improve optical switching time. The method may also include mechanically stabilizing actuators 24 with a base plate 22 having mounting holes 29 with stress isolation through-cuts 38 and a recessed center portion 34 to accommodate actuators 24.

It should be understood, of course, that the foregoing relates to preferred embodiments of the invention and that modifications may be made without departing from the spirit and scope of the invention as set forth in the following claims.

We claim:

1. A cross-connect switch comprising:
   a switching mirror;
   a lens mount securing a first optical fiber collimating lens so that a light path from said first optical fiber collimating lens is in a stable alignment relative to said switching mirror and a second optical fiber collimating lens; and
   an actuator connected to said switching mirror wherein:
      said actuator uses a flexure that provides repeatability of mechanical motion in moving said switching mirror between two distinct positions: the first position into said light path and the second position out of said light path;
      the repeatability of the first position and the second position maintains said alignment of said light path relative to said switching mirror;
      the light path enters the second optical fiber collimating lens when the switching mirror is moved into the light path;
      the light path enters a third optical fiber collimating lens when the switching mirror is moved out of the light path; and
      the length of the light path entering the second optical fiber collimating lens equals the length of the light path entering the third optical fiber collimating lens.

2. The cross-connect switch of claim 1 wherein said actuator comprises a flexure whereby a repeatability of actuator motion is provided for switching said switching mirror into and out of said light path.

3. The cross-connect switch of claim 1 wherein a mechanical motion of said actuator is damped using a damping fluid.

4. The cross-connect switch of claim 1 wherein said actuator includes a mechanical motion amplifier.

5. The cross-connect switch of claim 1 wherein said actuator includes a mechanical motion amplifier and said switching mirror is attached to said mechanical motion amplifier in a thermally stable manner.

6. The cross-connect switch of claim 1, further comprising a base plate, said base plate including a mounting hole wherein said mounting hole is provided with a stress isolation through-cut.

7. The cross-connect switch of claim 1 wherein said lens mount comprises a hole with uniform boundary for providing a thermally stable attachment for said optical fiber collimating lens.

8. The cross-connect switch of claim 1 wherein said cross-connect switch conforms to a Telcordia GR-1221 industry standard.

9. The cross-connect switch of claim 1 wherein said cross-connect switch conforms to a Telcordia GR-1073 industry standard.

10. A cross-connect switch, comprising:
a switching mirror;
an actuator connected to said switching mirror whereby said switching mirror is switched into and out of a light path;
a lens mount for securing an optical fiber collimating lens wherein said lens mount comprises a hole with a uniform boundary for providing a thermally stable attachment for said optical fiber collimating lens and wherein said hole is at a 45-degree angle to a reflecting surface of said switching mirror, whereby said light path from said optical fiber collimating lens is maintained in an alignment relative to said switching mirror and a second lens, said lens mount comprising a second hole, said second hole and said hole defining an axis of said lens mount wherein said second hole and said hole are at a 45-degree angle to said axis, and wherein said lens mount is disposed so that every light path in said cross-connect switch is of equal length to said light path.

11. The cross-connect switch of claim 10 wherein said actuator comprises a flexure whereby a repeatability of actuator motion is provided for switching said switching mirror into and out of said light path.

12. The cross-connect switch of claim 10 wherein a mechanical motion of said actuator is damped using a damping fluid.

13. The cross-connect switch of claim 10 wherein said actuator includes a mechanical motion amplifier and said switching mirror is attached to said mechanical motion amplifier in a thermally stable manner.

14. The cross-connect switch of claim 10, further comprising a base plate, said base plate including a mounting hole wherein said mounting hole is provided with a stress isolation through-cut.

15. The cross-connect switch of claim 10 wherein said cross-connect switch conforms to a Telcordia GR-1221 industry standard and a Telcordia GR-1073 industry standard.

16. A cross-connect switch comprising:
a switching mirror;
a lens mount for securing an optical fiber collimating lens whereby a light path from said optical fiber collimating lens is in an alignment relative to said switching mirror and a second lens, said lens mount including a hole with a uniform boundary for providing a thermally stable attachment for said optical fiber collimating lens and wherein said hole is at a 45-degree angle to a reflecting surface of said switching mirror, whereby said light path from said optical fiber collimating lens is maintained in an alignment relative to said switching mirror and said second lens, said lens mount further including a second hole, said second hole and said hole defining an axis of said lens mount wherein said second hole and said hole are at a 45-degree angle to said axis, and wherein said lens mount is disposed so that every light path in said cross-connect switch is of equal length to said light path; and
an actuator connected to said switching mirror, wherein said actuator comprises a flexure, wherein said actuator includes a mechanical motion amplifier and said switching mirror is attached to said mechanical motion amplifier in a thermally stable manner, and wherein a mechanical motion of said actuator is damped using a damping fluid, whereby a repeatability of actuator motion is provided for switching said switching mirror into and out of said light path.

17. The cross-connect switch of claim 16, further comprising a base plate, said base plate including a mounting hole wherein said mounting hole is provided with a stress isolation through-cut.

18. The cross-connect switch of claim 16, wherein said cross-connect switch conforms to a Telcordia GR-1221 industry standard and a Telcordia GR-1073 industry standard.

19. An add/drop module for an optical switching network, comprising:
a fiber optic terminating in an optical fiber collimating lens;
a cross-connect switch comprising:
a switching mirror;
a lens mount for securing said optical fiber collimating lens, said lens mount comprising a first hole with a uniform boundary for providing a thermally stable attachment for said optical fiber collimating lens, wherein said first hole is at a 45-degree angle to a reflecting surface of said switching mirror, whereby a light path from said optical fiber collimating lens is maintained in an alignment relative to said switching mirror and a second lens, wherein said lens mount comprises a second hole, said second hole and said first hole defining an axis of said lens mount wherein said second hole and said first hole are at a 45-degree angle to said axis, and wherein said lens mount is disposed so that every light path in said cross-connect switch is of equal length to said light path; and
an actuator connected to said switching mirror, wherein said actuator comprises a flexure, wherein said actuator includes a mechanical motion amplifier and said switching mirror is attached to said mechanical motion amplifier in a thermally stable manner, and wherein a mechanical motion of said actuator is damped using a damping fluid, whereby a repeatability of actuator motion is provided for switching said switching mirror into and out of said light path.

20. The add/drop module of claim 19, further comprising a base plate for stabilizing said actuator, said base plate including a mounting hole wherein said mounting hole is provided with a stress isolation through-cut.

21. The add/drop module of claim 19, wherein said cross-connect switch conforms to a Telcordia GR-1221 industry standard and a Telcordia GR-1073 industry standard.

22. A communication system, comprising:
a fiber optic terminating in an optical fiber collimating lens;
a cross-connect switch comprising:
a switching mirror;
a lens mount for securing said optical fiber collimating lens, said lens mount comprising a first hole with a uniform boundary for providing a thermally stable attachment for said optical fiber collimating lens, wherein said first hole is at a 45-degree angle to a reflecting surface of said switching mirror, whereby a light path from said optical fiber collimating lens is maintained in an alignment relative to said switching mirror and a second lens, wherein said lens mount comprises a second hole, said second hole and said first hole defining an axis of said lens mount wherein said second hole and said first hole are at a 45-degree angle to said axis, and wherein said lens mount is disposed so that every light path in said cross-connect switch is of equal length to said light path; and an actuator connected to said switching mirror, wherein said actuator comprises a flexure, wherein said actuator includes a mechanical motion amplifier and said switching mirror is attached to said mechanical motion amplifier in a thermally stable manner, and wherein a mechanical motion of said actuator is damped using a damping fluid, whereby a repeatability of actuator motion is provided for switching said switching mirror into and out of said light path.

23. The communication system of claim 22, further comprising a base plate for stabilizing said actuator, said base plate including a mounting hole wherein said mounting hole is provided with a stress isolation through-cut.

24. The communication system of claim 22 wherein said cross-connect switch conforms to a Telcordia GR-1221 industry standard and a Telcordia GR-1073 industry standard.

25. The communication system of claim 22 wherein said cross-connect switch is connected for use as a protection switch.

26. The communication system of claim 22 wherein said cross-connect switch is connected for use as a non-blocking switch.

27. The communication system of claim 22 wherein said cross-connect switch is connected for use as an add/drop module.

28. The communication system of claim 22, wherein said communication system comprises a core router, and wherein said core router includes said cross-connect switch.

29. A method for optically switching light beams comprising steps of:
   securing a first optical fiber collimating lens in a lens mount in a thermally stable manner so that a light path from said first optical fiber collimating lens is maintained in an alignment relative to a switching mirror and a second optical fiber collimating lens;
   moving the switching mirror into the light path to pass a light beam to the second optical fiber collimating lens and out of the light path to pass the light beam to a third optical fiber collimating lens wherein said switching mirror is moved using an actuator having a flexure so that the alignment of the light path relative to said switching mirror is repeated whenever the switching mirror is moved into the light path.

30. The method of claim 29 further comprising a step of damping a mechanical motion of said actuator with a damping fluid.

31. The method of claim 29 further comprising a step of connecting said switching mirror to said actuator in a thermally stable manner.

32. The method of claim 29 further comprising a step of stabilizing said actuator with a base plate comprising a mounting hole wherein said mounting hole is provided with a stress isolation through-cut.

33. A method for optically switching light beams comprising steps of:
   securing an optical fiber collimating lens in a lens mount in a thermally stable manner whereby a light path from said optical fiber collimating lens is maintained in an alignment relative to a switching mirror and a first output;
   moving said switching mirror into said light path to pass a light beam to the first output and out of said light path to pass the light beam to a second output using an actuator having a flexure whereby:
      said alignment of the light path relative to said switching mirror is repeated whenever the switching mirror is moved into the light path;
      repeatability variation is less than 1 dB per million cycles; and wherein:
      the light beam travels the same distance from said optical fiber collimating lens to the first output as from said optical fiber collimating lens to the second output.

34. The method of claim 33 further comprising a step of damping a mechanical motion of said actuator with a damping fluid to decrease optical switching time.

35. The method of claim 33 further comprising a step of connecting said switching mirror to said actuator in a thermally stable manner.

36. The method of claim 33 further comprising a step of stabilizing said actuator with a base plate comprising a mounting hole wherein said mounting hole is provided with a stress isolation through-cut.

37. A method for optically switching light beams comprising steps of:
   providing a working input optical fiber, a working output optical fiber, and an add input optical fiber;
   securing an optical fiber collimating lens for each of said working input optical fiber, said working output optical fiber, and said add input optical fiber in at least one lens mount in a thermally stable manner whereby a first light path from said working input optical fiber is maintained in an alignment relative to said working output optical fiber and a second light path from said add input optical fiber is maintained in an alignment relative to a switching mirror and said working output optical fiber;
   moving said switching mirror out of said first light path and said second light path using an actuator having a flexure whereby said working input optical fiber is connected to said working output optical fiber; and
   moving said switching mirror into said first light path and said second light path using said actuator having a flexure whereby said add input optical fiber is connected to said working output optical fiber.

38. The method of claim 37 further comprising a step of damping a mechanical motion of said actuator with a damping fluid.

39. The method of claim 37 further comprising a step of connecting said switching mirror to said actuator in a thermally stable manner.

40. The method of claim 37 further comprising a step of stabilizing said actuator with a base plate comprising a mounting hole wherein said mounting hole is provided with a stress isolation through-cut.

* * * * *